United States Patent [19]

Pomeroy

[11] Patent Number: 4,771,800

[45] Date of Patent: Sep. 20, 1988

[54] DISSOLUTION PERFORMANCE BY INJECTION THROUGH A DIE-TYPE NOZZLE

[75] Inventor: John M. Pomeroy, Jackson, N.J.

[73] Assignee: Conoco Inc., Ponca City, Okla.

[21] Appl. No.: 73,664

[22] Filed: Jul. 13, 1987

[51] Int. Cl.4 .................................................. F17D 1/16
[52] U.S. Cl. ........................................ 137/13; 137/605
[58] Field of Search .................................. 137/13, 605

[56] References Cited

U.S. PATENT DOCUMENTS 3,601,079  8/1971  Giles ................................. 137/13 X
3,826,279  7/1974  Verschuur ........................ 137/13 X
4,340,076  7/1982  Weitzen ............................ 137/13

Primary Examiner—Alan Cohan
Attorney, Agent, or Firm—C. R. Schupbach

[57] ABSTRACT

Drag reduction in hydrocarbon fluids flowing through conduits is improved by the injection of high molecular weight non-crystalline hydrocarbon soluble drag-reducing polymers through dies having multiple openings at substantially the same distance from the conduit wall.

4 Claims, 1 Drawing Sheet

DISSOLUTION PERFORMANCE BY INJECTION THROUGH A DIE-TYPE NOZZLE

This invention relates to a method for improving drag reduction in hydrocarbons flowing through conduits. More specifically, this invention relates to an improved method for improving drag reduction especially in hydrocarbon flowing through conduits, by injecting the drag reducing agent through at least one die having multiple openings. The method provides surprisingly increased drag reduction over current injection techniques for any drag reducing agent in solution form due to the high visco-elastic nature of such materials. The increase in drag reduction is larger than surface area effects alone.

Drag reduction of hydrocarbon fluids flowing through conduits is known as described in U.S. Pat. No. 3,629,676. This reference provides a method by which percent drag reduction can be measured. However, the reference simply describes inserting the drag reducing additives as a dissolved solid.

Other representative, but non-exhaustive art in the area includes U.S. Pat. No. 3,736,288 in which various drag reducing formulations are added to exhibit a staggered dissolving or controlled dissolving characteristic using varying molecular weight fractions and/or particle size. The reference also discloses pumpability, pourability, stratification resistance and the like. U.S. Pat. No. 3,601,079 describes a water-soluble polymeric material mixed with water in a mixing chamber prior to injection into a pipeline. U.S. Pat. No. 3,884,252 describes a process for reducing oxidative degradation and cold flow of polymer crumb by immersing the crumb in a non-solvent and then dusting prior to injecting the polymer crumb or slurry of polymer crumb and water into a hydrocarbon fluid and allowing the crumb to gradually and continuously dissolve throughout the pipeline. Another system for injection of friction reducing polymers is described in U.S. Pat. No. 4,263,926. A drag reducing dispersing metering system is described in U.S. Pat. No. 3,900,034.

There also exists a group of art relating to a method for dissolving polymers in solvent. This art is nonexhaustively represented by U.S. Pat. Nos. 2,639,275, 3,468,322, 3,891,593 and 4,537,513. These references deal with methods for dissolving a fixed amount of polymer in a fixed amount of solvent utilizing recycling or dissolving means. However, such methods of dissolving polymer require extra apparatus and it would be highly preferable to inject drag reducing agents directly into a pipeline. This application is related to a commonly assigned copending application entitled "Improved Polymeric Drag Reducer Performance by Injection Through a Land-Length Die", U.S. patent application Ser. No. 073,663, filed July 13, 1987.

It is therefore an object of the present invention to provide a improved method for the injection of drag reducing agents into conduits containing flowing hydrocarbons in order to increase the drag reducing effectiveness of such additives. Other objects will become apparent to those skilled in this art as the description proceeds.

I have now discovered an improved method for the injection of high molecular weight non-crystalline hydrocarbon soluble polymers into conduits containing flowing hydrocarbons comprising injecting said polymer as a solution containing up to 50% polymer by weight through at least one die having multiple openings wherein said openings, are preferably but not critically each substantially at equal distances from the conduit wall. The invention further comprises a preferred embodiment wherein the openings are located substantially at the injection end of the die. Such a die can be most simply described as a "spaghetti" die from its ability to form multiple strands of drag reducing polymer which approximate spaghetti in appearance prior to dissolution.

BRIEF DESCRIPTION OF THE DRAWINGS

The drawing is a figure containing various die configurations and placements which refer to the experimental section of the specification.

DETAILED DESCRIPTION OF THE DRAWINGS

Figure 1:
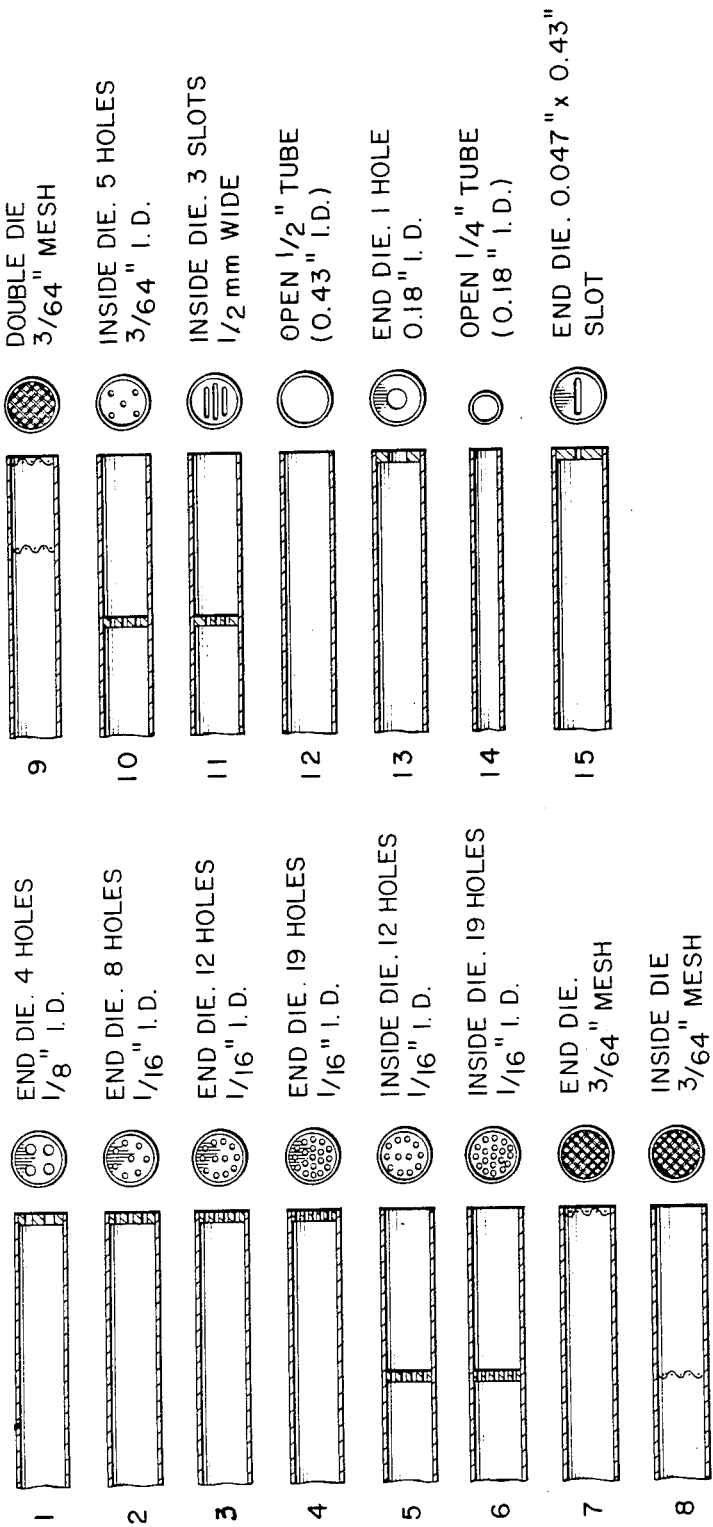

In FIG. 1, die configuration 1-1 shows a four-hole opening die, each opening ⅛-inch in diameter. FIG. 1-2 shows an 8-hole opening die, each opening 1/16-inch in diameter. FIG. 1-3 shows a 12-hole opening die, each opening 1/16-inch in diameter. FIG. 1-4 shows a 19-hole opening die, each opening 1/16-inch in diameter. FIG. 1-5 shows a 12-hole opening die, each opening 1/16-inch in diameter, wherein the die is placed within the injection nozzle (inside die), allowing the polymer to recombine prior to injection. FIG. 1-6 shows a 19-hole opening die, each opening 1/16-inch in diameter, wherein the die is an inside die placed approximately 2 inches inside the nozzle. FIG. 1-7 and 1-8 are comparative die configurations composed of 3/64-inch mesh, wherein 1-7 is at the injection end of the die, and 1-8 contained the die approximately 2 inches inside the injection nozzle. FIG. 1-9 shows the same die approximately 2½ inches inside the injection nozzle. FIG. 1-10 shows a 5-opening die, each opening 3/64 inch in diameter, placed approximately 3 inches inside the injection nozzle. FIG. 1-11 shows a three-slot die, each ½ millimeter wide, placed about 3 inches inside the injection nozzle. FIG. 1-12 illustrates a conventional injection nozzle having a single open port at the injection end. FIG. 1-13 is a restricted die having 1 opening 0.18 inches in diameter. FIG. 1-14 is a ¼-inch tubing open die having a 0.18-inch opening. FIG. 1-15 shows a die similar to 1-13 with a slot opening.

Drag reducing agents are currently injected in the pipelines to provide drag reduction. Obtaining optimum drag reduction effect depends on placing such agents such that efficient dissolution in the pipeline fluid is obtained. Such agents can be inserted into the pipeline in many forms, but current practice is to inject a very thick polymer solution containing up to about 50% polymer, but preferably containing 10% polymer by weight or less.

I have discovered that obtaining optimum dissolution depends heavily upon die configuration and injection. In current practice, one or more single opening dies are used to inject a polymer or polymer solution into the flowing hydrocarbon conduit. Using the present invention, a surprising increase in drag reduction efficiency is obtained.

The present invention does not depend solely upon surface area effects, although in general larger surface areas are known to give better chances for dissolution. Using the present invention, however, other factors come into play and determine the overall effectiveness of the drag reducing additive.

Although theoretical in nature and I do not wish to be bound thereby, I believe that obtaining optimum dissolution is dependent upon forming stable polymeric strands of the drag reducing additives which enter the pipeline flow stream. These additives then "wire draw" to smaller diameter strands while dissolving under the dynamic effects of the flowing pipeline fluid. Using the current commercial practice of injecting the drag reducing additive through an individual open port in the pipeline wall, only limited dissolution and stranding is obtained. By using a nozzle or port with multiple openings, dissolution is improved. Likewise, stranding is improved by providing multiple strands which are stable under the wire draw and dynamic effects of the dissolution process. Such dies also provide optimum strand dimensions for dissolution.

The present invention is more concretely described with reference to the examples and figures below. The examples and figures are provided to illustrate the present invention and not to limit it.

The examples were carried out according to a test procedure which was standard throughout the examples. In the test procedure, dissolution capacity of various nozzles was tested by injecting a drag reducing additive, CDR® Flow Improver (trademark of and sold by Conoco Specialty Products Inc.) into Number 2 diesel fuel flowing through a 2-inch diameter pipe and measuring the resulting drag reduction as described in U.S. Pat. No. 3,692,676. The drag reducing test loop consists of 600 feet of 2-inch schedule 80 pipe containing 5 segments of 87 feet each. The pressure differential in each segment can be measured sequentially. The diesel fuel, at approximately 75 degrees F., was passed through the system at 60 gallons per minute (gpm), or 6.52 feet per second during testing. Various levels of CDR Flow Improver additive 102M (obtained from Conoco Specialty Products Inc.) was injected into the system at the same rate of 100 parts per million (ppm) in each test and the resultant drag reduction was measured in each pipe segment. Fifteen different nozzles were tested, most fabricated of ½-inch tubing. The injection pump used was a constant drive cylinder pump connected to the injection nozzle by a length of ½-inch tubing.

EXAMPLE 1

Eleven nozzle designs were tested to illustrate the effect of surface area on dissolution behavior. Test results showed that surface area does not control dissolution behavior. While a larger surface area allows a better chance of dissolution, other factors come into play which determine overall effectiveness. As set forth in the tables below, open tube nozzles having a higher surface area generation did not yield higher percent drag reduction, but actually yielded lower percent drag reduction in the first segment. Surface area generation rate was based on an injection rate of 23.4 cubic centimeters per minute. The injection rate was also used to calculate approximate shear rate. The results are set forth in Table 1.

TABLE 1

| Nozzle Tested | Wetted Perimeter (in.) | Open Flow Area (in$^2$) | Surface Area Generation Rate (in$^2$/SEC) | Approx. Shear Rate (1/SEC) | % Drag Reduction 1st Segment | % Drag Reduction 5th Segment |
|---|---|---|---|---|---|---|
| 12 | 1.35 | 0.145 | 0.22 | 3 | 18.2 | 43.0 |
| 14 | 0.57 | 0.0254 | 0.53 | 42 | 10.3 | 42.9 |
| 13 | 0.57 | 0.0254 | 0.53 | 42 | 14.5 | 44.4 |
| 1 | 1.57 | 0.049 | 0.76 | 31 | 35.8 | 54.3 |
| 2 | 1.57 | 0.0245 | 1.53 | 124 | 39.5/39.9 | 55.4/56.2 |
| 3 | 2.36 | 0.0368 | 1.53 | 83 | 40.9 | 55.2 |
| 4 | 3.73 | 0.0583 | 1.53 | 52 | 39.7 | 54.2 |
| 7 | 5.25 | 0.062 | 2.02 | 50 | 40.7/40.3 | 55.8/54.4 |
| 9 | 5.25 | 0.062 | 2.02 | 50 | 34.5/32.1 | 49.7/49.9 |
| 15 | 0.95 | 0.0202 | 1.12 | 150 | 32.3 | 51.4 |

The data of Table 1 shows that for open tube nozzles a higher surface area generation rate did not determine drag reduction percentage. In some cases, a higher surface area yielded a lower drag reduction percentage, as can be seen by comparing nozzles 1-12 with 1-14. For the nozzles containing dies, the best performance came from nozzles providing medium surface area generation, as can be seen by comparing test results obtained from nozzles 1-13, 1-1, 1-2, 1-3, 1-4, and 1-7. For injection nozzles having the same surface area generation, a significant difference in percent drag reduction occurred due to other effects, as can be seen by comparing nozzle 1-7 with 1-9.

EXAMPLE 2

Tests were carried out to show the relative importance of die placement. The effect of die placement on percent drag reduction is set forth in Table 2.

TABLE 2

| Nozzle Tested | Wetted Perimeter (in.) | Open Flow Area (in$^2$) | Surface Area Generation Rate (in$^2$/SEC) | Approx. Shear Rate (1/SEC) | % Drag Reduction 1st Segment | % Drag Reduction 5th Segment |
|---|---|---|---|---|---|---|
| 12 | 1.35 | 0.145 | 0.22 | 3 | 18.2 | 43.0 |
| 5 | 1.35 | 0.145 | 0.22 | 83 | 25.7 | 44.3 |
| 6 | 1.35 | 0.145 | 0.22 | 52 | 13.6 | 45.2 |
| 8 | 1.35 | 0.145 | 0.22 | 50 | 13.2 | 44.0 |
| 10 | 1.35 | 0.145 | 0.22 | 471 | 23.5 | 43.0 |
| 11 | 1.35 | 0.145 | 0.22 | 410 | 19.2 | 43.2 |
| 1 | 1.57 | 0.049 | 0.76 | 31 | 35.8 | 54.3 |
| 2 | 1.57 | 0.0245 | 1.53 | 124 | 39.5/39.9 | 55.4/56.2 |
| 3 | 2.36 | 0.0368 | 1.53 | 83 | 40.9 | 55.2 |
| 4 | 3.73 | 0.0583 | 1.53 | 52 | 39.7 | 54.2 |
| 7 | 5.25 | 0.062 | 2.02 | 50 | 40.7/40.3 | 55.8/54.4 |

The test results as set forth in Table 2 show that dies placed several inches before the injection end of the nozzle did not yield a significant advantage in drag reduction performance over a fully open nozzle. The data also shows that a multiple hole die at the injection end of the nozzle yielded a significant advantage as set forth in examples 1-1, 1-2, 1-3, 1-4 and 1-7. It is clear that it is important to exert the die effects on the drag reducing additive immediately prior to entering the flow stream. Exerting die effects some distance prior to the injection end of the nozzle allows the drag reducing additive to recombine and relax from the effects of the die, thus lowering drag reduction efficiency.

EXAMPLE 3

Tests were carried out to determine the effect of shear rate on dissolution effectiveness of the drag reducing additive. The results are set forth in Table 3.

TABLE 3

| Nozzle Tested | Wetted Perimeter (in.) | Open Flow Area (in²) | Surface Area Generation Rate (in²/SEC) | Approx. Shear Rate (1/SEC) | % Drag Reduction 1st Segment | % Drag Reduction 5th Segment |
| --- | --- | --- | --- | --- | --- | --- |
| 12 | 1.35 | 0.145 | 0.22 | 3 | 18.2 | 43.0 |
| 5  | 1.35 | 0.145 | 0.22 | 83 | 25.7 | 44.3 |
| 6  | 1.35 | 0.145 | 0.22 | 52 | 13.6 | 45.2 |
| 8  | 1.35 | 0.145 | 0.22 | 50 | 13.2 | 44.0 |
| 10 | 1.35 | 0.145 | 0.22 | 471 | 23.5 | 43.0 |
| 11 | 1.35 | 0.145 | 0.22 | 410 | 19.2 | 43.2 |

The data of Table 3 shows that dissolution effectiveness is dependent upon shear rate through the die. For nozzles with the die in the middle, the die with the higher shear rates yielded the best percent drag reduction in the first segment as compared to an open nozzle injection die, whereas the dies with lower shear rates did not perform as well.

EXAMPLE 4

The effect of multiple dies upon the injection of drag reducing additive were tested. The results are set forth in Table 4.

TABLE 4

| Nozzle Tested | Wetted Perimeter (in.) | Open Flow Area (in²) | Surface Area Generation Rate (in²/SEC) | Approx. Shear Rate (1/SEC) | % Drag Reduction 1st Segment | % Drag Reduction 5th Segment |
| --- | --- | --- | --- | --- | --- | --- |
| 7 | 5.25 | 0.062 | 2.02 | 50 | 40.7/ 40.3 | 55.8/ 54.4 |
| 9 | 5.25 | 0.062 | 2.02 | 50 | 34.5/ 32.1 | 49.7/ 49.9 |

The test results indicate that nozzles having a second die upstream of a die at the nozzle end (1-9) actually reduced the effectiveness relative to a nozzle with a die only at the end (1-7). It is clear that the die conditions the drag reducer prior to injection, but that such conditioning can be negative in effect if the dies are placed in series and insufficient time is provided for the polymer to recombine or "heal" prior to entering the flowing liquid.

The present invention thus modifies drag reducing additives mechanically prior to injection to enhance the physical flow properties and subsequently obtain better dissolution and stranding of the drag reducing additive. Better stranding properties as the drag reducing additive enters the pipeline flow stream provides stable strand formation which is essential to optimum dissolution and performance of the drag reducing additive.

It is only necessary that the die perform some work upon the drag reducing additive at the point the additive is injected. It is preferred that the die have multiple openings and contain at least four openings. The openings can be of any size desired and can include mesh and the like. Although injection dies usually inject polymer into the flowing hydrocarbon stream at an angle of about 90 degrees, angles lower than a 90 degree position can be used.

The effect of the present invention has not been seen in the prior art, since most meshes or screens in injections are used upstream of the injection nozzle and the injection pump of the die and are used primarily for straining foreign objects from passage through the pump or injection into the pipeline. Thus, no improvement in drag reduction has been seen until a screen mesh or multiple die is placed at or near the end of the injection nozzle.

It is preferred that the openings be at substantially equal distance from the pipeline wall. The openings can, in fact, be around the circumference of an injection conduit so long as the openings themselves form the actual injection point and all parts provide the additive conditioning necessary. Dies known in the art, such as a "quill" or a "flute" where injection ports are at progressively different distances from the conduit wall do not provide the advantages of the present invention, since the shear conditioning varies greatly.

While certain embodiments and details have been shown for the purpose of illustrating this invention, it will be apparent to those skilled in this art that various changes and modifications may be made herein without departing from the spirit or scope of the invention.

I claim:

1. An improved method for the injection of high molecular weight non-crystalline hydrocarbon soluble polymers into conduits containing flowing hydrocarbons, comprising injecting said polymer as a solution containing up to 50% polymer through at least one die having multiple openings wherein said die openings are located substantially at the injection end of the die.

2. A method is described in claim 1 wherein the die contains from 4 to 16 openings.

3. A method as described in claim 2 wherein the die openings provide a hollow polymer tube to the flowing hydrocarbons.

4. A method as described in claim 2 wherein the die injects polymer into the flowing hydrocarbon at an angle lower than 90 degrees with respect to the flowing hydrocarbon stream.

* * * * *